United States Patent [19]

Sangster

[11] 3,745,383

[45] July 10, 1973

[54] IMPROVED BUCKET BRIGADE DELAY LINE

[75] Inventor: Frederik Leonard Johan Sangster, Emmasingel, Eindhoven, Netherlands

[73] Assignee: U.S. Philips Corporation, New York, N.Y.

[22] Filed: Mar. 3, 1972

[21] Appl. No.: 231,765

Related U.S. Application Data

[63] Continuation of Ser. No. 88,684, Nov. 12, 1970, abandoned, which is a continuation-in-part of Ser. No. 675,883, Oct. 17, 1967, Pat. No. 3,546,490.

[30] Foreign Application Priority Data

Sept. 25, 1970 Netherlands ...................... 7014136

[52] U.S. Cl. ......... 307/293, 307/221 C, 307/221 D, 307/246, 307/304

[51] Int. Cl. ......................................... H03k 17/26

[58] Field of Search .................... 307/221 R, 221 C, 307/221 D, 251, 293, 304, 246; 328/37, 55

[56] References Cited

UNITED STATES PATENTS

| | | | |
|---|---|---|---|
| 3,395,292 | 7/1968 | Bogert | 307/304 X |
| 3,431,433 | 3/1969 | Ball et al. | 307/221 C |
| 3,474,260 | 10/1969 | Frohbach | 307/221 R |
| 3,546,490 | 12/1970 | Sangster | 307/246 X |

*Primary Examiner*—Stanley D. Miller, Jr.
*Attorney*—Frank R. Trifari

[57] ABSTRACT

A capacitive delay device comprising a sequence of capacitances which have been interconnected by the series arrangement of the main current paths of at least two transistors, the capacitance of the capacitor connected between the output and control electrodes of the first transistor being as small as possible.

6 Claims, 5 Drawing Figures

INVENTOR.
FREDERIK L.J. SANGSTER

BY
Frank R. Trifari
AGENT

INVENTOR.
FREDERIK L.J. SANGSTER

BY

AGENT

INVENTOR.
FREDERIK L.J. SANGSTER
BY [signature]
AGENT

AN IMPROVED BUCKET BRIGADE DELAY LINE

This application is a continuation of application Ser. No. 88,684, filed Nov. 12, 1970, now abandoned which in turn is a continuation-in-part of my co-pending application Ser. No. 675,883, filed Oct. 17, 1967, and now issued as U.S. Pat. No. 3,546,490.

The invention relates to a device for delaying a train of signal samples of an electrical signal. The device comprises a sequence of stages which each include a first and a second capacitance interconnected by means of the main current path of one transistor, the second capacitance of each stage forming the first capacitance of the succeeding stage. The input electrode circuit of the transistor includes the first capacitance and its output electrode circuit includes the second capacitance. The switching voltage source is arranged to be connected between the control electrode of the transistor and that terminal of the first capacitance which is not connected to the input electrode of the transistor. In a known arrangement of this kind, as described in U.S. Pat. Application Ser. No. 173,249, filed Aug. 19, 1971 the transistor is a field effect transistor. The field effect transistors are interconnected in groups so as to form junction points to which switching signals are applied which are ascendingly shifted in phase in the order of the numbers of the junction points.

Applicant recognizes the problem that when a large number of stages was used satisfactory operation was interfered with by the fact that in each stage a slight degradation of sudden voltage variations occurs. This means that when the input voltage abruptly changes from 0 volts to V volts, the output signal at the output of the arrangement changes from 0 volts to ( $V - \delta$) volts, where $\delta$ is the error voltage. If subsequently the input signal remains at the value of V volts, the output signal will also assume this value. The said effect deleteriously affects the frequency characteristic of the device.

It is an object of the present invention to provide a solution of the aforementioned problem, and a device according to the invention is characterized in that in at least several stages the input electrode of the transistor is connected to the first capacitance through the main current path of a second transistor.

The invention is based on the recognition that the said signal degradation is due to the fact that the threshold voltage of a transistor depends on the transferred signal value $\Delta V$. When a comparatively small number of stages is used, this effect will not be troublesome, but when a large number of stages, for example several hundreds of stages, are used, it will be highly troublesome. The effect will be particularly strong when the transistors used are field effect transistors. This is due to the fact that electrostatic reaction takes place from the drain electrode by way of the substrate on the channel between the source electrode and the drain electrode of the field effect transistor used, and that on the other hand the length of the channel slightly depends on the voltage at the drain electrode. In field effect transistors having a high-resistivity substrate the electrostatic reaction is the dominant factor, whereas in field effect transistors having a low-resistivity substrate the second effect is dominant.

An embodiment of the invention will now be described, by way of example, with reference to the accompanying diagrammatic drawings, in which.

Figure 1:
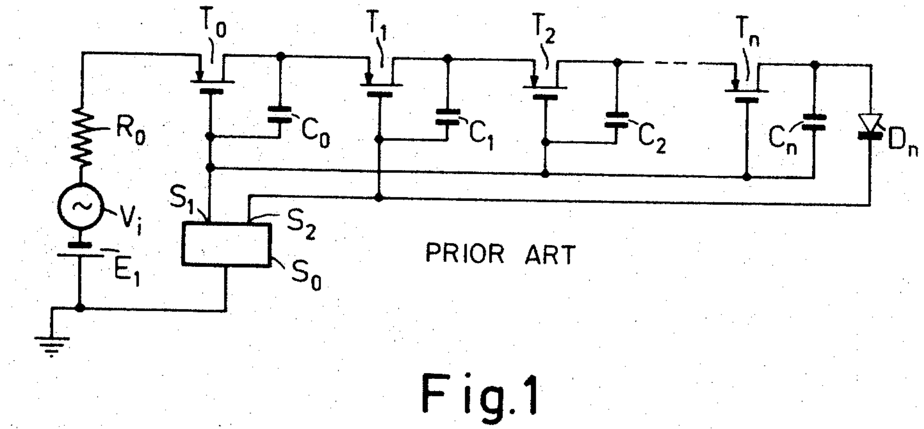
FIG. 1 shows the known arrangement.

In the known delay device shown in FIG. 1, the main current paths of field effect transistors $T_0, T_1, \ldots, T_n$ are connected in series. A capacitor $C_0$ has been connected between the drain and the gate of the transistor $T_0$. A capacitor $C_1$ has been connected between the drain and the gate of the transistor $T_1$. A capacitor $C_n$ has been connected between the drain and the gate of the transistor $T_n$. The gate of the transistor $T_1$ has been connected to an output $S_2$ of a switching voltage source $S_0$. The gates of the transistors $T_0$ and $T_n$ have been connected to an output $S_1$ of the switching voltage source $S_0$. A diode $D_n$ has one terminal connected to the drain of the transistor $T_n$ and the other terminal connected to the output $S_2$ of the switching voltage source $S_0$. The source of the transistor $T_0$ has been connected to a point of constant potential through the series combination of a resistor $R_0$, an input voltage source $V_i$ and a direct-voltage source $E_1$.

Figure 2:
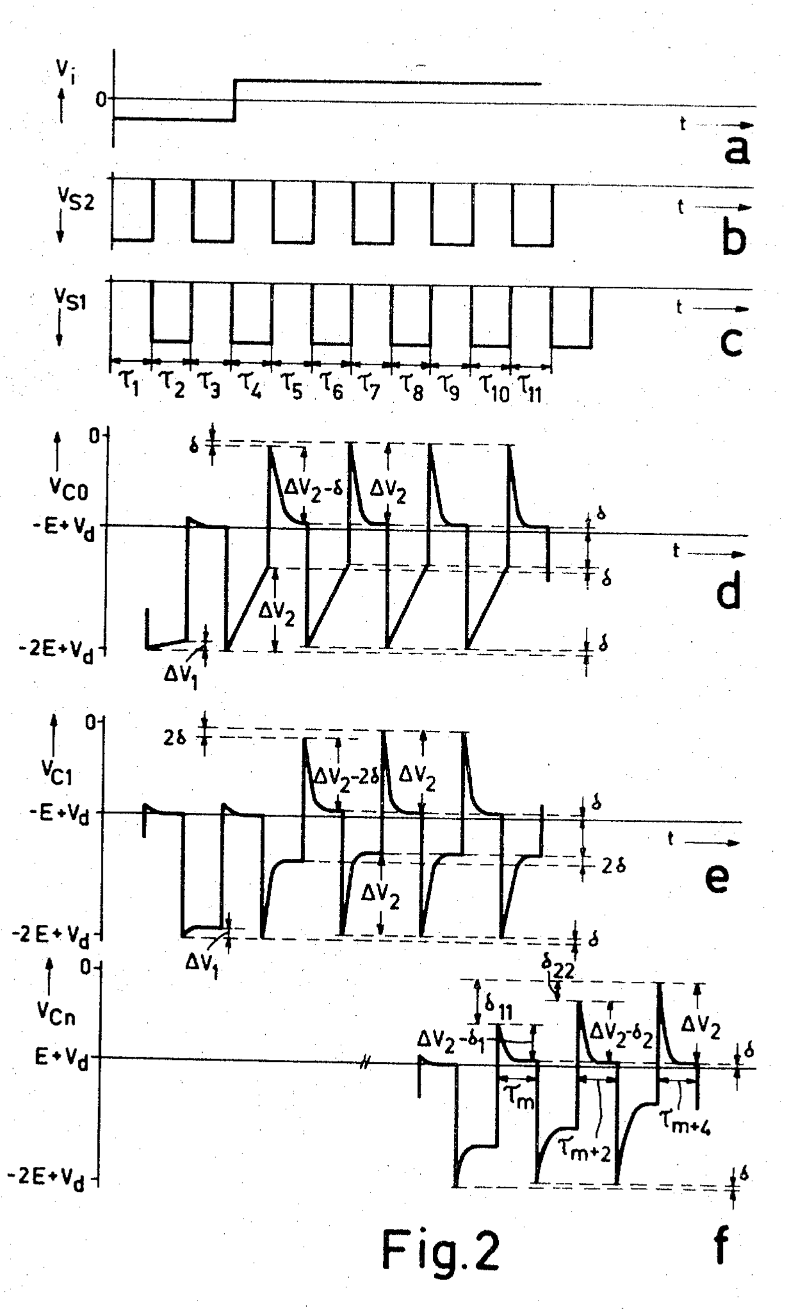
FIG. 2 (*a–f*) shows the voltage waveforms at different points in the known arrangement.

The operation of the known arrangement will be described with reference to FIG. 2. FIGS. 2*b* and 2*c* show the voltage waveforms at the outputs $S_2$ and $S_1$, respectively. These voltages are symmetrical square-wave voltages having a maximum of 0 volt and a minimum of $-E$ volts. During the time in which the voltage at the point $S_1$ is negative with respect to ground, i.e., during time intervals $\tau_2, \tau_4, \tau_6, \tau_8$, etc. in FIG. 2*c*, information about the value of the input signal $V_i$ is transferred to the capacitor $C_0$. During the time interval $\tau_2$ the input signal $V_i$ is small, whereas during the time interval $\tau_4$ and the following time intervals the input signal $V_i$ is large. During the time interval $\tau_2$ there will flow through the transistor $T_0$ a current of about $V_i/R_0$ amperes, where $V_i$ is the value of the input signal during the time interval $\tau_2$ under consideration and $R_0$ is the resistance of the resistor $R_0$ of FIG. 1. The said current will cause the voltage at the drain of the transistor $T_0$ to increase by an amount $\Delta V_1$, see FIG. 2*d*. During the time interval $\tau_3$ the capacitor $C_0$ is discharged through the transistor $T_1$ until the voltage across this capacitor has become equal to $-(E-V_d)$ volts, where $V_d$ is the threshold voltage of the transistor $T_1$, the value of this threshold voltage being determined by the signal value $\Delta V$. During the time interval $\tau_4$ charge is again supplied to the capacitor $C_0$ through the transistor $T_0$, so that the voltage at the drain of the transistor $T_0$ will rise by an amount of $\Delta V_2$ volts, see FIG. 2*d*. During the time interval $\tau_5$ the capacitor $C_0$ is discharged through the transistor $T_1$ until the voltage across this capacitor has become equal to $-(E-V'_d)$ volts, where $V'_d$ is that threshold voltage of the transistor $T_1$ which is associated with the signal value $\Delta V_2$. It has been found that the threshold voltage $V'_d$ associated with the signal value $\Delta V_2$ exceeds the threshold voltage $V_d$ associated with the signal value $\Delta V_1$ by an amount of $\delta$ volts. This means that the voltage drop across the capacitor $C_0$ which occurs during the time interval $\tau_5$ will be equal to $(\Delta V_2-\delta)$ volts instead of to $\Delta V_2$ volts. At the instant at which the time interval $\tau_6$ begins the voltage at the drain of the transistor $T_0$ will be equal to $\{-(2E-V_d)+\delta\}$ volts, see FIG. 2*d*. At the end of the said time interval the voltage at the drain of the transistor $T_0$ will be equal to $\{-(2E-V_d)+\delta\}+\Delta V2$ volts. Consequently, the voltage drop across the capacitor Co will be equal to $\Delta V_2$ volts during this time interval.

During the time interval $\tau_3$ the capacitor $C_1$ is charged through the transistor $T_1$ until the voltage across this capacitor has risen by an amount of $\Delta V_1$ volts, see FIG. 2*e*. During the time interval $\tau_4$ the capacitor $C_1$ is discharged through the transistor $T_2$ until the voltage across this capacitor has become equal to $-(E-V_d)$ volts, where $V_d$ is the threshold voltage of the transistor $T_2$ associated with the signal value $\Delta V_1$. During the time interval $\tau_5$ the capacitor $C_1$ is charged through the transistor $T_1$. The voltage rise across the capacitor $C_1$ will be equal to the voltage drop across the capacitor $C_0$ during the time interval under consideration. Consequently, the said voltage rise will be equal to $(\Delta V_2-\delta)$volts. During the time interval $\tau_6$ the capacitor $C_1$ is discharged through the transistor $T_2$ until the voltage across this capacitor has become equal to $-(E-V''_d)$ volts, where $V''_d$ is the threshold voltage of the transistor $T_2$ associated with the signal value $(\Delta V_2-\delta)$. Since $\delta$ is much smaller than $\Delta V_2$, we have to a good approximation : $V''_d=V'_d$. This means that the voltge drop across the capacitor $C_1$ during the time interval $\tau_6$ will be equal to $(\Delta V_2-2\ \delta)$ volts instead of to $\Delta V_2$ volts, as it should have been. A simple calculation shows that the voltage drop across the capacitor $C_n$ of the capacitive store of FIG. 1, which voltage drop corresponds to the voltage drop $(\Delta V_2-\delta)$ volts across the capacitor $C_0$ during the time interval $\tau_5$, will be equal to $(\Delta V_2-n\cdot\delta)$ volts, where $n$ is the number of the capacitor $C_n$. However, this will hold only if $n.\ \delta$ is small compared with $\Delta V_2$. If $n\cdot\delta$ becomes comparable to $\Delta V_2$, i.e., if $n$ is large, the corresponding voltage drop will be equal to $(1-\delta)^n$ volts. However, if $n.\ \delta$ becomes comparable to the signal value $\Delta V_2$, second-order and third-order effects also will occur. This means that in contradistinction to the example discussed with reference to FIGS. 2*d* and 2*e* in which one signal value only was not correct (see the interval $\tau_5$ of FIG. 2*d* and the interval $\tau_6$ of FIG. 2*e*), at least two successive signal values will not be correct, as is shown diagrammatically in FIG. 2*f*. In this Figure the signal values during the intervals $\tau_m$ and $\tau_{m+2}$ are not correct. During the interval $\tau_m$ the signal value is equal to $(\Delta V_2-\delta_{11})$ volts, and during the interval $\tau_{m+2}$ it is equal to $(\Delta V_2-\delta_{22})$ volts. Not before the interval $\tau_{m+4}$ will the signal value be correct and equal to $\Delta V_2$ volts.

Figure 3:
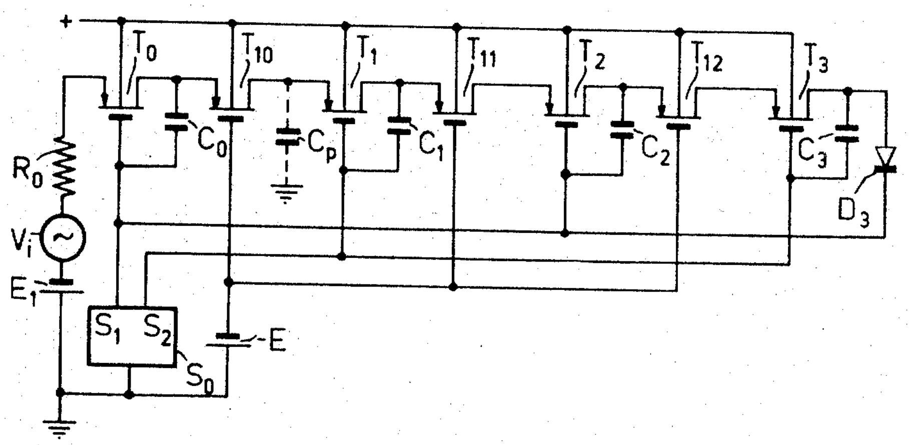
FIG. 3 shows an embodiment of an arrangement according to the invention.

FIG. 3 shows the delay device according to the invention. It comprises transistors $T_0$, $T_{10}$, $T_1$, $T_{11}$, $T_2$, $T_{12}$ and $T_3$ the main current paths of which are connected in series. Capacitors $C_0$, $C_1$, $C_2$ and $C_3$ are connected between the drain and gate electrodes of the transistors $T_0$, $T_1$, $T_2$ and $T_3$ respectively. The source of the transistor $T_0$ is connected to a point of constant potential through the series connection of a resistor $R_0$ and a signal voltage source $V_i$. The gates of the transistors $T_0$ and $T_2$ are connected to an output $S_1$ of a switching voltage source $S_0$, and the gates of the transistors $T_1$ and $T_3$ are connected to an output $S_2$ of the switching voltage source $S_0$ . The gates of the transistors $T_{10}$, $T_{11}$ and $T_{12}$ are connected to a point of constant potential. The drain of the transistor $T_3$ is connected to the anode of a semiconductor diode $D_3$ the cathode of which is connected to the output $S_1$ of the switching voltage source $S_0$.

The threshold voltage $V_d$ of, for example, the transistor $T_{10}$ determines the reference voltage across the capacitor $C_0$. This reference voltage is equal to $-(E-V_d)$ volts. The said threshold voltage $V_d$ depends on the voltage at the drain of the transistor $T_{10}$ during the transfer of charge between the capacitors $C_0$ and $C_1$. During this charge transfer the voltage at the gate of transistor $T_1$ is equal to $-$ 2E volts so that the voltage at the drain of the transistors $T_1$ is equal to $-(2E-V_1)$ volts, where $V_1$ is the threshold voltage of the transistor $T_1$. This threshold voltage depends on the voltage at the drain of the transistor $T_1$ during the said charge transfer. When the amplitudes of the signal samples shifted are successively equal to $\Delta V_1$ and $\Delta V_2$ volts, where $\Delta V_2>>\Delta V_1$, during the transfer of the signal sample $\Delta V_2$ the threshold voltage $V_1$ will be higher than the threshold voltage as it was during the transfer of the signal sample $\Delta V_1$ by an amount $\delta$. This means that the voltage at the drain of the transistor $T_{10}$ will be higher by an equal amount. Since $\delta$ is small, this means that the change in the threshold voltage $V_d$ of the transistor $T_{10}$ will be many times smaller than $\delta$ volts. Consequently, the change in the reference voltage $-(E-V_d)$ volts across the capacitor $C_0$ due to the sudden signal variation will also be many times smaller.

The changes which now will be produced in the reference level of the capacitor $C_1$ are determined by the parasitic capacitance $C_p$ between the drain and gate electrodes of the transistor $T_{10}$. As has been set forth hereinbefore, the threshold voltage $V_1$ of the transistor $T_1$ during the transfer of the signal sample $\Delta V_2$ will be higher by an amount $\delta$ than the threshold voltage as it was during the transfer of the signal sample $\Delta V_1$. Hence, during the transfer of the signal sample $\Delta V_2$ a loss of charge will occur. This charge loss is stored in the parasitic capacitance $C_p$ and is equal to $\delta\cdot C_p$ coulombs. Consequently, this charge loss may be considerably reduced by reducing the capacitance $C_p$ to a minimum so that it may be much smaller than the charge loss which would occur in the absence of the transistor $T_{10}$. In the latter case, the corresponding charge loss would be equal to C. $\delta$ coulombs, where C is the capacitance of the capacitor $C_0$. A simple calculation shows that the provision of the transistor $T_{10}$ and the reduction of the capacitance $C_p$ will improve the pulse response by a factor $C_p/C$ as compared with the pulse response obtained in the delay device shown in FIG. 1.

Figure 4:
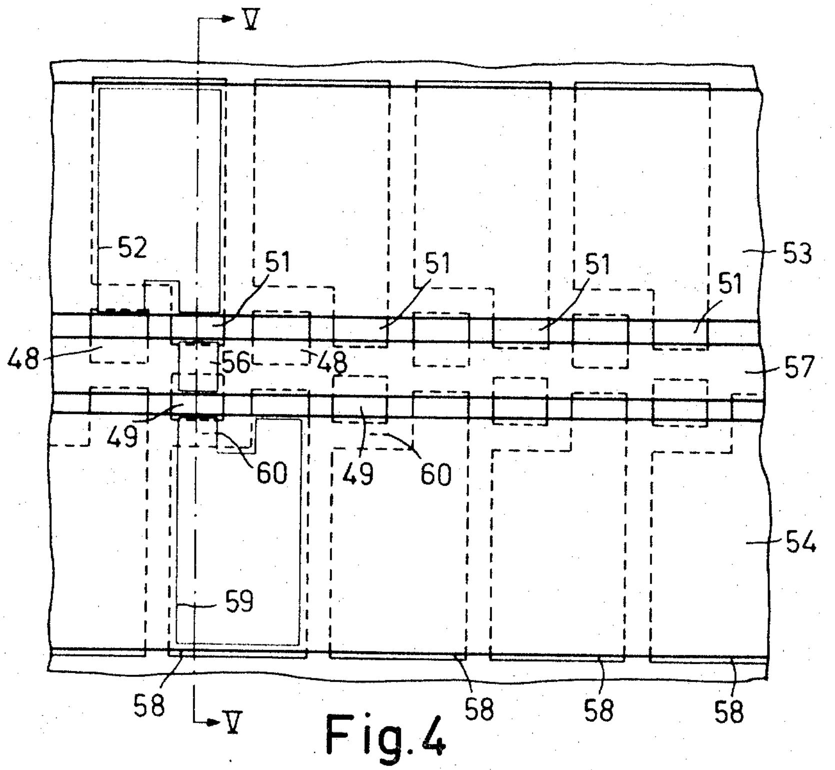
FIG. 4 is a top-plan view of an integrated embodiment of a delay device as shown in FIG. 3.
Figure 5:
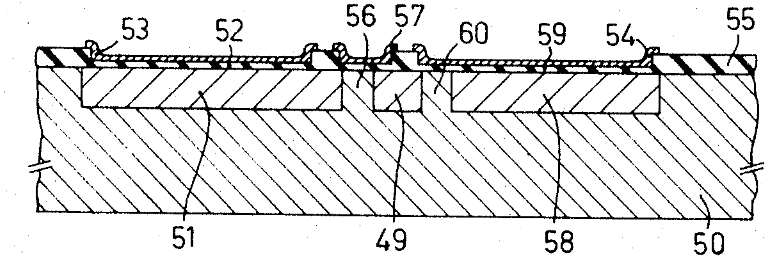
FIG. 5 is a cross-sectional view taken on the line V—V of FIG. 4.

The semiconductor device shown in FIGS. 4 and 5 comprises a substrate 50, which may be made of an insulating material provided with at least one surface region consisting of semiconductor material or, as is the case in the present embodiment, may itself consists of semiconductor material. Arrays of semiconductor regions 48, 49, 51 and 58 have been provided in the surface region of the substrate 50. The regions .... together with the regions 48 form field effect transistors and on the other hand the regions 48 together with the regions 49 form field effect transistors. Thus, at the line of intersection *V—V* of FIG. 4, the region 51 together with the region 49 forms the second field effect transistor of a storage stage which according to the invention has been provided between the first capacitor and the source of the first field effect transistor of the respective storage stage. The said first field effect transistor is constituted by the regions 49 and 58. The first capacitor is constituted by the capacitance between the surface region 51 and a metal strip 53, which are separated from one another by an insulating layer 55 with which the semiconductor surface is coated. The second capacitor of the respective storage stage is constituted by the capacitance between the gate of the first field effect transistor and the surface region 58, which also are separated from one another by the insulating layer 55. The surface region 51 forms not only the source of the second transistor of the stage under consideration but also the drain of the first field effect transistor of the preceding storage stage, the said first transistor being formed by the regions 51 and 48. The surface region 58 forms not only the drain of the first field effect transistor of the storage stage under consideration but also the source of the second field effect transistor of the succeeding storage stage, which second field effect transistor is formed by the regions 58 and 48. The gates of the second field effect transistors of each storage stage are connected to a metal strip 57. The gates of the transistors formed by the regions 51 and 49 are connected to a metal strip 59, and the gates of the field effect transistors formed by the regions 58 and 59 are connected to a metal strip 54. The metal strips form part of the electrical inputs for the control signals.

The semiconductor device shown in FIGS. 4 and 5 may entirely be manufactured in a manner commonly used in semiconductor technology. The substrate 50 may consist of n-type silicon. The p-type regions 48, 49, 51 and 58 of sizes 24 × 28 $\mu$m and 130 × 68 $\mu$m respectively may then be provided by conventional photolithographic and diffusion techniques.

The width of the channel region 65 may, for example, be 12 $\mu$m. The pn-junctions between the p-type regions and the substrate may, for example, extend to a depth of about 2 to 3 $\mu$m from the semiconductor surface, The insulating layer 55 may consist of silicon oxide and/or silicon nitride and may be from 0.1 to 0.2 $\mu$m thick beneath the gates 59, 54 and 57 within the lines 52 and 59 in FIG. 4. Outside the said lines the insulating layer 55 will preferably be thicker, for example 1 $\mu$m thick.

In order to prevent undesirable channel formation, channel interruptors, for example diffused channel interruptors, may be provided. The conductive strips 53 and 54 may, for example, be 115 $\mu$m wide, whilst the width of the conductive strip 57 may be 26 $\mu$m. The strips preferably consist of Al or some other suitable electrode material and may, for example, be 0.3 $\mu$m thick. The semiconductor device may be mounted in the usual manner in a conventional case.

In the delay device shown in FIGS. 3 and 4 three conductive strips are used. Alternatively, the delay device may have four conductive strips. In this case (see FIG. 3) the gates of the transistors $T_0$ and $T_2$ may be connected to a first strip, the gates of the transistors $T_1$ and $T_3$ to a second strip, the gates of the transistor $T_{10}$ and $T_{12}$ to a third strip and the gate of the transistor $T_{11}$ to a fourth strip. A direct-voltage source will be connected between the first and fourth conductive strips. Another direct-voltage source will be connected between the second and third conductive strips. The first and second strips may be connected to the outputs $S_1$ and $S_2$ respectively of the switching voltage source $S_0$ of FIG. 3.

It is further possible to connect the gate of the each of the transistors $T_{10}$, $T_{11}$ and $T_{12}$ to the gate of the respective preceding transistor instead of to the voltage source E, see FIG. 3. In the semiconductor body shown in FIGS. 4 and 5 this may be effected by interconnecting the conductive strips 54 and 57. This provides the advantage that the parasitic capacitances between the drains and gates of the transistors $T_{10}$, $T_{11}$ and $T_{12}$ may be reduced, so that the pulse response also will be improved. In addition, only two conductive strips will be required and consequently the surface area required for each storage unit will be reduced. Moreover, the additional direct-voltage source E may be dispensed with.

Obviously, the invention is not restricted to the examples described and to a person skilled in the art many modifications will be possible without departing from the scope of the invention. For example, field effect transistors having either an n-type channel or a p-type channel region may be used. Further, field effect transistors of the enhancement type or of the depletion type may be used. Also, a substrate of low resistivity, for example 1 ohm, may be used, whilst the channel length may be slightly increased. These two steps enable the reaction to be further reduced. The circuit arrangement described with reference to FIG. 3 may, for example, be used to advantage in realizing a filter for electrical signals. In combination with the store described conventional input and output circuits may be used. Furthermore, at least two of the said stores may be connected in parallel so as to have common inputs and/or common outputs.

What is claimed is:

1. A circuit comprising a plurality of serially coupled stages, each of said stages comprising first and second transistors, each of said transistors having a main current path between first and second conduction electrodes and one control electrode for controlling the conduction therein, input means coupled to the first stage first conduction electrode for receiving a signal to be delayed and output means coupled to the last stage second conduction electrode for providing the delayed signal, within each of said stages said first transistors second conduction electrode being coupled to said second transistor first conduction electrode, each of said second transistor second conduction electrodes except in said last stage being coupled to the succeeding stage first transistor first conduction electrode, within each stage capacitive means coupled between said first transistor control electrode and said first transistor second conduction electrode, means for applying switching pulses to each of said first transistor control electrodes, and means coupled to said second transistor control electrode for turning on its main current path.

2. A circuit as claimed in claim 5 wherein said turning on means comprises a voltage source coupled to each of said second transistor control electrodes.

3. A circuit as claimed in claim 5 wherein said applying means comprises means for applying switching pulses of opposite polarity to successive first transistor control electrodes.

4. A circuit as claimed in claim 5 wherein said capacitive means comprises a capacitor.

5. A circuit as claimed in claim 5 wherein the transistors and the capacitive means of each stage are integrated in a semiconductor body, said body comprising areas defining said electrodes of said transistors, and areas defining said capacitive means.

6. A circuit as claimed in claim 9 wherein said transistors comprise metal oxide semiconductor field effect transistors.

* * * * *